United States Patent
Nomura et al.

(10) Patent No.: US 6,275,551 B1
(45) Date of Patent: Aug. 14, 2001

(54) APPARATUS FOR RECEIVING DIGITAL INFORMATION SIGNALS

(75) Inventors: Kiyoshi Nomura; Tadashi Fukami, both of Kanagawa; Tatsuya Tsuruoka, Tokyo; Jin Nakamura, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/124,048

(22) Filed: Jul. 29, 1998

(30) Foreign Application Priority Data

Jul. 31, 1997 (JP) .................................................. 9-205537

(51) Int. Cl.[7] .................................................. H04L 7/00
(52) U.S. Cl. .......................................... 375/365; 375/344
(58) Field of Search ................................... 375/365, 344; 370/208

(56) References Cited

U.S. PATENT DOCUMENTS

| | | |
|---|---|---|
| 5,228,025 | 7/1993 | Le Floch et al. . |
| 5,287,388 | * 2/1994 | Ogura et al. .......................... 375/344 |
| 5,694,389 | * 12/1997 | Seki et al. ............................ 370/208 |
| 5,883,598 | * 3/1999 | Parl et al. ............................. 342/457 |
| 6,058,101 | * 5/2000 | Huang et al. ......................... 370/208 |
| 6,094,168 | * 7/2000 | Duffet-Smith et al. ............... 342/463 |

FOREIGN PATENT DOCUMENTS

| | | |
|---|---|---|
| 0683576 | 11/1995 | (EP) . |
| 0706273 | 4/1996 | (EP) . |
| 0729250 | 8/1996 | (EP) . |

\* cited by examiner

Primary Examiner—Chi Pham
Assistant Examiner—Kevin M Burd
(74) Attorney, Agent, or Firm—Jay H. Maioli

(57) ABSTRACT

An apparatus for receiving digital information signals, including a signal receiving portion for receiving a digital information signal, and for transmitting digital data composed of a series of transmission frames each divided into a plurality of segmental periods called symbols and including a reference Symbol for synchronization, a reference Symbol data extracting portion for extracting data transmitted through a reference Symbol from each of transmission frames of digital data obtained from the received digital information signal, a frequency offset detecting portion for obtaining a first frequency offset detection output based on the received digital information signal a strength of, data transmitted through the, reference Symbol at every transmission frame and obtaining also a second frequency offset detection output based on with the received digital information signal and a strength of specific data included in data transmitted in each of the plurality of Symbols, and a frequency synchronizing control portion operative to cause the received digital information signal to have reduced frequency offset in response to the first and second frequency offset detection outputs.

2 Claims, 2 Drawing Sheets

APPARATUS FOR RECEIVING DIGITAL INFORMATION SIGNALS

BACKGROUND OF THE INVENTION

1. Field of the Invention

The present invention relates generally to an apparatus for receiving digital information signals, and more particularly, to a digital information signal receiving apparatus which is operative to receive a digital information signal, such as a digital audio broadcasting signal, and to obtain a reproduced information signal, such as a reproduced audio signal, based on the digital information signal received thereby.

2. Description of the Prior Art

Although an analog audio broadcasting system which includes an amplitude-modulated (AM) audio broadcasting system in which audio signals are transmitted through the form of an AM audio information signal and a frequency-modulated (FM) audio broadcasting system in which audio signals are transmitted through the form of a FM audio information signal, have been put to practical use for a long time in the field of audio broadcasting, there has been recently proposed to introduce a digital audio broadcasting system in which audio signals are transmitted through the form of a digital audio information signal for the purpose of improving quality of audio information transmitted or received in the system. Especially, in the region of Europe, the digital audio broadcasting system called "DAB" has been already put to practical use in some countries.

The digital audio information signal transmitted from a broadcasting station under the digital audio broadcasting system is called a digital audio broadcasting signal. The digital audio broadcasting signal carries not only audio information data forming a digital audio signal but also service information data representing service information, such as weather forecast, traffic information and so on, and further carries control information data which are necessitated for reproducing the digital audio signal based on the audio information data and the service information based on the service information data on the receiving side. Then, the digital audio broadcasting signal is a modulated wave signal obtained by modulating a carrier wave signal with digital data, such as audio information data, service information data, control information data and so on, in accordance with the Orthogonal Frequency Division Multiplexing (OFDM) system, and the digital data transmitted by the digital audio broadcasting signal is composed of a series of frame units, each of which is called a transmission frame.

The transmission frame has a time duration of, for example, 96 ms and contains 77 segmental periods each named Symbol and identified with Symbol 0 to Symbol 76, respectively, as shown in FIG. 1. The Symbol 0 is a null Symbol where the modulated wave signal does not exist in actual fact. The Symbol 1 is a reference Symbol for synchronization. The Symbol 0 which is the null Symbol corresponds to about 1.3 ms and each of the Symbol 0 to the Symbol 76 corresponds to about 1.25 ms.

A channel named Synchronous Channel is allocated to the Symbol 0 and the Symbol 1, a channel named Fast Information Channel (FIC) is allocated to the Symbol 2 to the Symbol 4 following the Symbol 1, and a channel named Main Service Channel (MSC) is allocated to the Symbol 5 to the Symbol 76 following the Symbol 4, as shown in FIG. 1. The MSC is composed of a series of frames each named Common Interleaved Frame (CIF) for transmitting the audio information data and the service information data. The FIC is composed of series of blocks each named First Information Block (FIB). The FIB contains a couple of portions of a FIB data field and an error checking word, and the FIB data field is composed of a series of groups each named Fast Information Groups (FIGs). The FIC thus formed transmits the control information data representing multiplex configuration information (MCI) and other information.

Each of the Symbol 1 to the Symbol 76 contains a couple of portions Gi and Se. The portion Gi is named Guard Interval and corresponds to about 0.246 ms. The portion Se is named Effective Symbol and corresponds to about 1 ms. An end portion Se' of the Effective Symbol Se contains the same data as those contained in the Guard Interval Gi.

In a digital information signal receiver which is used for receiving the digital audio broadcasting signal which is the modulated wave signal obtained by modulating a carrier wave signal with digital data, such as audio information data, service information data, control information data and so on, in accordance with the OFDM system and obtaining a reproduced audio signal based on the digital audio broadcasting signal received thereby, the digital data, such as the audio information data, the service information data, the control information data and so on, obtained based on the received digital audio broadcasting signal, may be accompanied with errors resulting from undesirable frequency offset of the received digital audio broadcasting signal. Accordingly, it has been previously proposed to detect the frequency offset of the received digital audio broadcasting signal on the strength of the digital data obtained based on the received digital audio broadcasting signal and to provide a frequency synchronizing control to the received digital audio broadcasting signal in response to the detected frequency offset, so that the frequency offset of the digital audio broadcasting signal is reduced.

The detection of frequency offset of the received digital audio broadcasting signal which is required for the frequency synchronizing control to the received digital audio broadcasting signal has been previously carried out with use of the reference Symbol for synchronization contained in each of the transmission frames constituting the digital data. That is, the reference Symbol is obtained from the digital data and caused to be subjected to frequency analysis and the frequency offset of the received digital audio broadcasting signal is calculated based on the result of the frequency analysis to which the reference Symbol is subjected, so that the frequency offset of the received digital audio broadcasting signal is detected.

Such a detection of frequency offset of the received digital audio broadcasting signal as carried out with use of the reference Symbol for synchronization is only practiced at every transmitting frame. Therefore, in the frequency synchronizing control to the received digital audio broadcasting signal, it is feared that a relatively long time is required to put the received digital audio broadcasting signal into a frequency synchronizing condition and further feared that the received digital audio broadcasting signal put in the frequency synchronizing condition is easily influenced adversely by undesirable variations in the digital audio broadcasting signal resulting from fading thereon or the like.

OBJECTS AND SUMMARY OF THE INVENTION

Accordingly, it is an object of the present invention to provide an apparatus for receiving digital information signals, by which a digital information signal for transmitting digital data composed of a series of transmission frames each containing a plurality of segmental periods each named Symbol and including a reference Symbol for synchronization is received, frequency offset of the received digital information signal is detected on the strength of digital data obtained from the received digital information signal, and the received digital information signal is subjected, in response to the detected frequency offset, to a frequency synchronizing control so that the frequency offset of the received digital information signal is reduced, and which avoids the aforementioned disadvantages encountered with the prior art.

Another object of the present invention is to provide an apparatus for receiving digital information signals, a digital information signal for transmitting digital data composed of a series of transmission frames each containing a plurality of segmental periods each named Symbol and including a reference Symbol for synchronization is received, frequency offset of the received digital information signal is detected on the strength of digital data obtained from the received digital information signal, and the received digital information signal is subjected, in response to the detected frequency offset, to a frequency synchronizing control so that the frequency offset of the received digital information signal is reduced, and in which the received digital audio broadcasting signal can be rapidly put into a frequency synchronizing condition.

A further object of the present invention is to provide an apparatus for receiving digital information signals, a digital information signal for transmitting digital data composed of a series of transmission frames each containing a plurality of segmental periods each named Symbol and including a reference Symbol for synchronization is received, frequency offset of the received digital information signal is detected on the strength of digital data obtained from the received digital information signal, and the received digital information signal is subjected, in response to the detected frequency offset, to a frequency synchronizing control so that the frequency offset of the received digital information signal is reduced, and in which the received digital audio broadcasting signal put in a frequency synchronizing condition can be prevented from being easily influenced adversely by undesirable variations in the digital audio broadcasting signal resulting from fading thereon or the like.

According to the present invention, there is provided an apparatus for receiving digital information signals, which comprises a signal receiving portion for receiving a digital information signal for transmitting digital data composed of a series of transmission frames each containing a plurality of segmental periods each named Symbol and including a reference Symbol for synchronization to obtain a received digital information signal, a reference Symbol data extracting portion for extracting data transmitted through a reference Symbol from each of transmission frames of digital data obtained from the received digital information signal, a frequency offset detecting portion for obtaining a first frequency offset detection output in connection with the received digital information signal on the strength of data transmitted through the reference Symbol at every transmission frame and obtaining also a second frequency offset detection output in connection with the received digital information signal on the strength of specific data included in data transmitted through each of a plurality of Symbols at every one of the Symbols, and a frequency synchronizing control portion operative to cause the received digital information signal to have reduced frequency offset in response to the first and second frequency offset detection outputs obtained from the frequency offset detecting portion.

In an embodiment of apparatus for receiving digital information signals according to the present invention, the frequency synchronizing control portion comprises a frequency convertor provided in the signal receiving portion for causing the digital information signal received by the signal receiving portion to be subjected to frequency conversion.

In the apparatus for receiving digital information signals thus constituted in accordance with the present invention, at the frequency offset detecting portion, the detection of frequency offset of the received digital information signal is carried out on the strength of the data transmitted through the reference Symbol contained in the digital date obtained from the received digital information signal at every transmission frame and the first frequency offset detection output in connection with the received digital information signal is obtained at every transmission frame, and the detection of frequency offset of the received digital information signal is carried out on the strength of the specific data included in the data transmitted through each of the Symbols constituting each transmission frame of the digital data obtained from the received digital information signal at every one of the Symbols and the second frequency offset detection output in connection with the received digital information signal is obtained at every one of the Symbols. Then, at the frequency synchronizing control portion, with the frequency synchronizing control to the received digital information signal carried out in response to, for example, a control signal which produced based on the first and second frequency offset detection outputs, the frequency offset of the received digital information signal is reduced in response to the first and second frequency offset detection outputs obtained from the frequency offset detecting portion.

Accordingly, the detection of frequency offset of the received digital information signal is carried out on the strength of the data transmitted through the reference Symbol contained in the digital date obtained from the received digital information signal at every transmission frame and carried out also on the strength of the specific data included in the data transmitted through each of the Symbols constituting each transmission frame of the digital data obtained from the received digital information signal at every one of the Symbols, and the detection outputs obtain thereby are reflected to the frequency synchronizing control to the received digital information signal so that the frequency offset of the received digital information signal is reduced. Consequently, in connection with the frequency synchronizing control to the received digital information signal, the received digital information signal can be rapidly put into a frequency synchronizing condition and the received digital information signal put in the frequency synchronizing condition can be prevented from being easily influenced adversely by undesirable variations in the digital information signal resulting from fading thereon or the like.

Further, in the embodiment of apparatus for receiving digital information signals according to the present invention, since the frequency synchronizing control portion comprises the frequency convertor provided in the signal receiving portion for causing the digital information signal received by the signal receiving portion to be subjected to frequency conversion, the frequency synchronizing control for reducing the frequency offset of the received digital information signal can be surely carried out with a relatively simple circuit structure.

The above, and other objects, features and advantages of the present invention will be become apparent from the following detailed description taken in conjunction with the accompanying drawings.

DESCRIPTION OF THE PREFERRED EMBODIMENT

Figure 2:
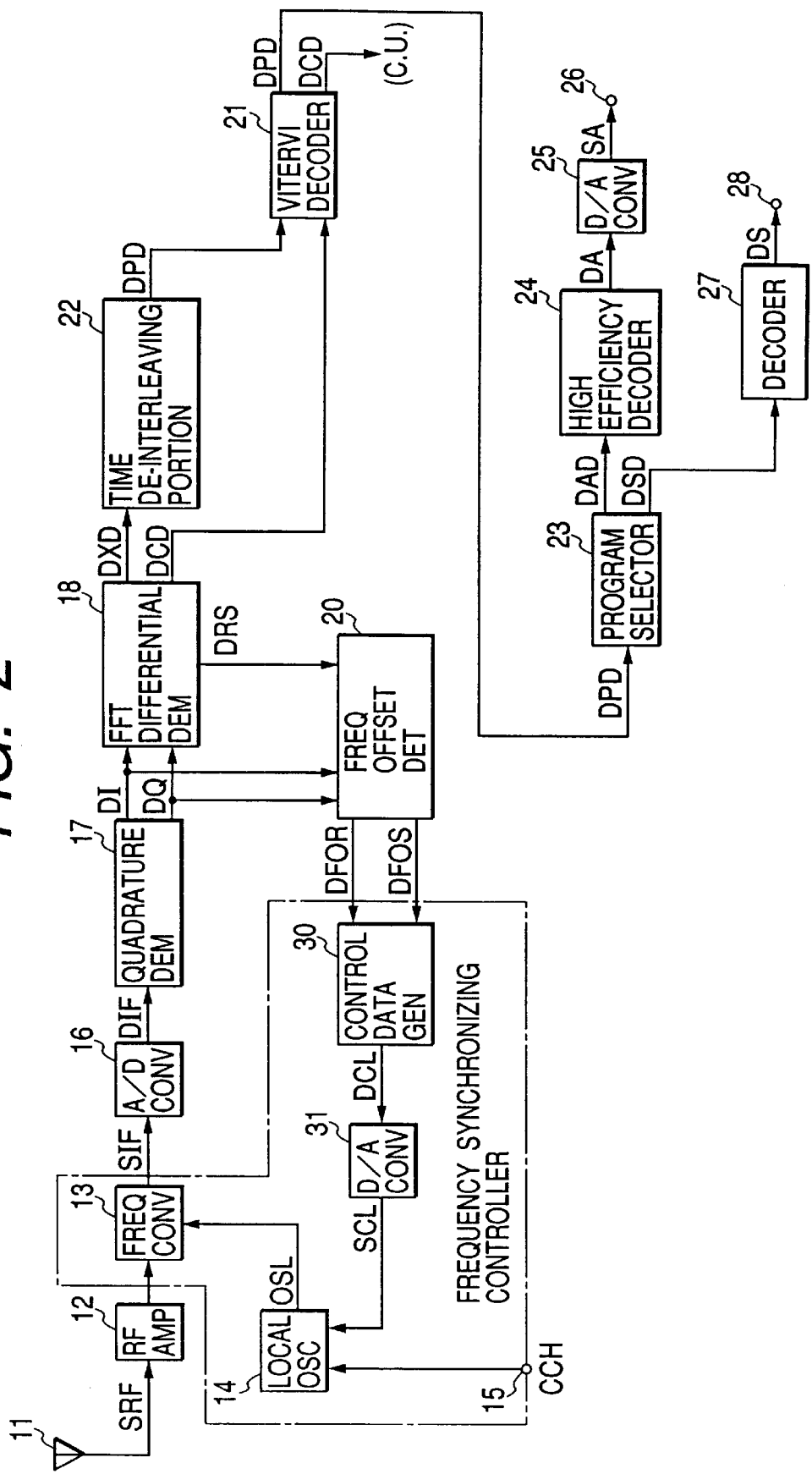
FIG. 2 is a schematic block diagram showing a main part of an embodiment of apparatus for receiving digital information signals according to the present invention.

FIG. 2 shows schematically a main part of an embodiment of apparatus for receiving digital information signals according to the present invention. The embodiment having the main part shown in FIG. 2 is operative to receive a digital audio broadcasting signal which is one of the digital information signals.

Figure 1:
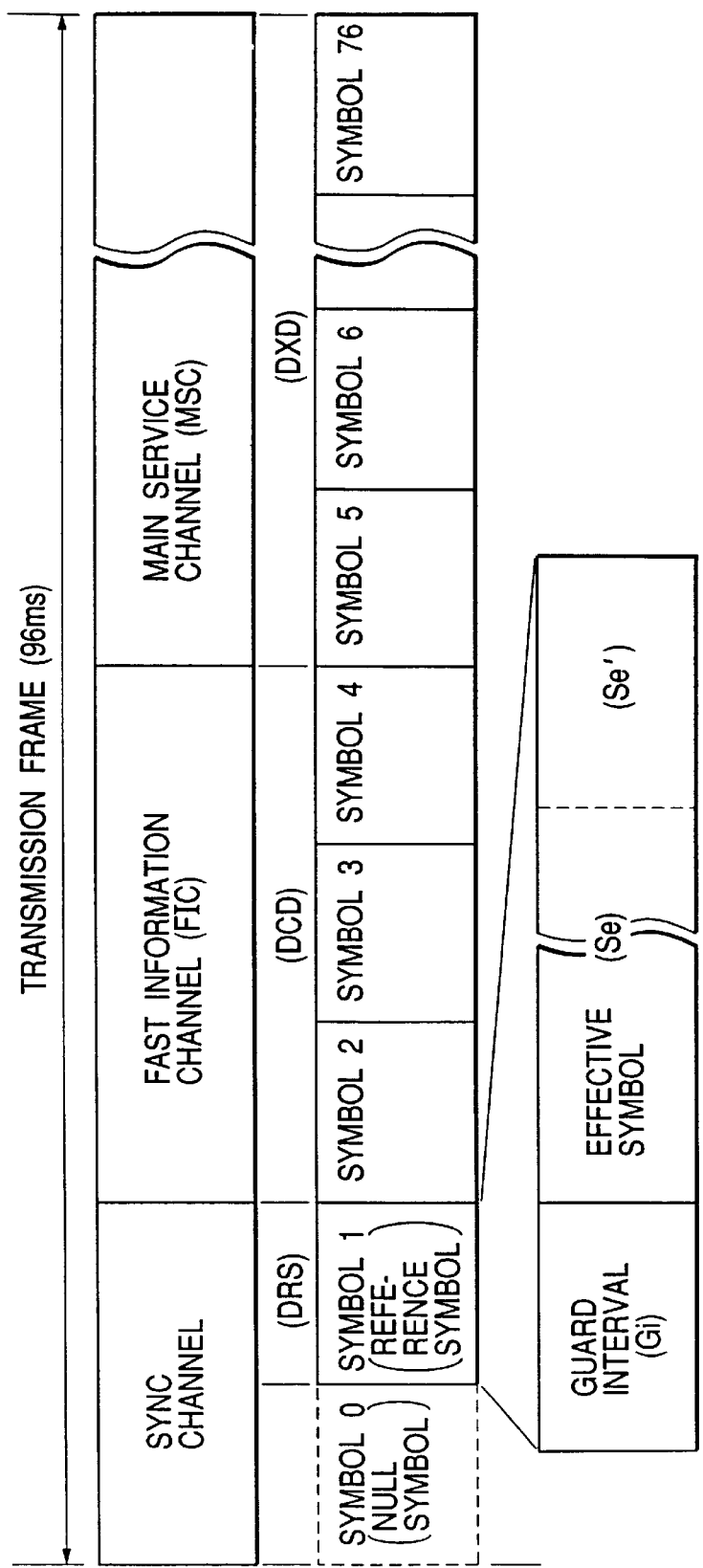
FIG. 1 is an illustration showing signal formats used for explaining a digital audio broadcasting signal which is one of digital information signals.

The digital audio broadcasting signal received by the embodiment having the main part shown in FIG. 2 is a modulated wave signal obtained by modulating a carrier wave signal with digital data, such as audio information data, service information data, control information data and so on, in accordance with the OFDM system and the digital data transmitted by the digital audio broadcasting signal is composed of a series of frame units each called a transmission frame, as shown in FIG. 1 and aforementioned.

Referring to FIG. 2, a digital audio broadcasting signal SRF which is one of a plurality of digital audio broadcasting signals transmitted from broadcasting stations and having reached to a receiving antenna 11 is amplified by a radio frequency amplifier 12 and then supplied to a frequency convertor 13. A local oscillation signal OSL from a local oscillator 14 is also supplied to the frequency convertor 13. The local oscillator 14 is operative to control, in accordance with a tuning control signal CCH supplied through a terminal 15, the local oscillation signal OSL to have a frequency appropriate to the carrier frequency of the digital audio broadcasting signal SRF.

In the frequency convertor 13, the digital audio broadcasting signal SRF is subjected to a frequency-converting processing with use of the local oscillation signal OSL to produce an intermediate frequency digital audio signal SIF having a predetermined intermediate frequency. The intermediate frequency digital audio signal SIF is derived from the frequency convertor 13 to be a received digital audio broadcasting signal and supplied to an analog to digital (A/D) convertor 16.

A digital intermediate frequency signal DIF corresponding to the intermediate frequency digital audio signal SIF is obtained from the A/D convertor 16 to be supplied to a quadrature demodulator 17. In the quadrature demodulator 17, the digital intermediate frequency signal DIF is subjected to a quadrature demodulation processing to produce I and Q signals DI and DQ which are a pair of quadrature demodulated output signals. The I and Q signals DI and DQ are derived from the quadrature demodulator 17 as digital data obtained from the received digital audio broadcasting signal.

The I and Q signals DI and DQ obtained from the quadrature demodulator 17 are supplied to each of a fast Fourier transform (FFT) differential demodulator 18 and a frequency offset detector 20. In the FFT differential demodulator 18, each of the I and Q signals DI and DQ is subjected to transformation from a time domain signal to a frequency domain signal to produce synchronous information data DRS representing synchronous information transmitted through Symbol 1, namely, a reference Symbol for synchronization to which a Synchronous Channel is allocated in each transmission frame, control information data DCD representing control information transmitted through Symbols 2 to 4 to which a Fast Information Channel (FIC) is allocated in each transmission frame, and composite data DXD composed of audio information data and service information data representing respectively audio information and service information transmitted through Symbols 5 to 76 to which a Main Service Channel (MSC) is allocated in each transmission frame. The audio information data and the service information data constituting the composite data DXD have been subjected to time interleaving arrangements.

Since the synchronous information data DRS representing the synchronous information transmitted through the reference Symbol for synchronization are obtained from the FFT differential demodulator 18, a reference Symbol data extracting portion for extracting data transmitted through the reference Symbol contained in each transmission frame of the digital data obtained from the received digital audio broadcasting signal, is constituted by the FFT differential demodulator 18.

The synchronous information data DRS are supplied from the FFT differential demodulator 18 to the frequency offset detector 20. The control information data DCD are supplied from the FFT differential demodulator 18 to a Vitervbi decoder 21. The composite data DXD are supplied from the FFT differential demodulator 18 to a time de-interleaving portion 22. In the time de-interleaving portion 22, program information data selected from the audio information data constituting the composite data DXD or program information data selected from the service information data constituting the composite data DXD are subjected to a time de-interleaving arrangement to be released from the time interleaving arrangement. Then, time de-interleaved program information data DPD are obtained from the time de-interleaving portion 22 to be supplied to the Vitervbi decoder 21.

In the Vitervbi decoder 21, the control information data DCD from the FFT differential demodulator 18 and the time de-interleaved program information data DPD from the time de-interleaving portion 22 are subjected respectively to error correction processings. The time de-interleaved program information data DPD subjected to the error correction processing are supplied from the Vitervbi decoder 21 to a program selector 23 and the control information data DCD subjected to the error correction processing are derived from the Vitervbi decoder 21 to be supplied to a control unit (C.U.) which is not shown in FIG. 2.

From the program selector 23, audio program data DAD or service program data DSD which are obtained based on the time de-interleaved program information data DPD or the control information data DCD subjected to the error correction processing at the Vitervbi decoder 21 are derived.

The audio program data DAD derived from the program selector 23 are supplied to a high efficiency decoder 24. In the high efficiency decoder 24, the audio program data DAD are subjected to a high efficiency decoding by which data suppressed in accordance with a high efficiency coding are expanded to produce decoded audio data DA.

The decoded audio data DA obtained from the high efficiency decoder 24 are supplied to a digital to analog (D/A) convertor 25 to be converted to an analog sound signal forming a reproduced audio signal SA corresponding to the decoded audio data DA. The reproduced audio signal SA is derived from the D/A convertor 25 to an output terminal 26.

The service program data DSD derived from the program selector 23 are supplied to a decoder 27. In the decoder 27, the service program data DSD are subjected to a decoding processing to produce reproduced service data DS based on the service program data DSD. The reproduced service data DS are derived from the decoder 27 to an output terminal 28.

In the frequency offset detector 20 to which the digital I and Q signals DI and DQ derived from the quadrature demodulator 17 and the synchronous information data DRS representing the synchronous information transmitted through the reference Symbol for synchronization obtained from the FFT differential demodulator 18 are supplied, the detection of frequency offset of the intermediate frequency digital audio signal SIF as the received digital audio broadcasting signal is carried out on the strength of both of the synchronous information data DRS and the digital I and Q signals DI and DQ.

In the detection of frequency offset of the intermediate frequency digital audio signal SIF carried out on the strength of the synchronous information data DRS, a correlation between the synchronous information transmitted through the reference Symbol (Symbol 1) as shown in FIG. 1 and represented by the synchronous information data DRS and reference synchronous information on a reference table provided previously in the frequency offset detector 20 is checked to obtain a value of correlation, then a frequency analysis is carried out by detecting a peak position of the value of correlation, and finally the frequency offset of the intermediate frequency digital audio signal SIF is calculated based on the result of the frequency analysis. This detection of frequency offset of the intermediate frequency digital audio signal SIF is carried out at every timing at which the synchronous information data DRS are supplied to the frequency offset detector 20, in other words, at every transmission frame of the digital I and Q signals DI and DQ derived from the quadrature demodulator 17.

As the result of the detection of frequency offset of the intermediate frequency digital audio signal SIF carried out on the strength of the synchronous information data DRS, frequency offset detection output data DFOR are obtained from the frequency offset detector 20 at every transmission frame of the digital I and Q signals DI and DQ and supplied to a control data generator 30.

In the detection of frequency offset of the intermediate frequency digital audio signal SIF carried out on the strength of the digital I and Q signals DI and DQ, a correlation between data transmitted through a Guard Interval Gi in each of Symbols 1 to 76 contained in each transmission frame of the digital I and Q signals DI and DQ and data transmitted through an end portion Se' of an Effective Symbol Se in one of the Symbols 1 to 76, which has been delayed by a time corresponding to the Effective Symbol Se, is checked to obtain a value of correlation, then the value of correlation thus obtained is subjected to an integration processing during a period corresponding to the data transmitted through the Guard Interval Gi, and finally the frequency offset of the intermediate frequency digital audio signal SIF is calculated based on the phase of a peak position of an integrated value of correlation as the result of the integration processing. This detection of frequency offset of the intermediate frequency digital audio signal SIF is carried out at every timing at which the data transmitted through each of the Symbols 1 to 76 contained in each transmission frame of the digital I and Q signals DI and DQ are supplied to the frequency offset detector 20, in other words, at every one of the Symbols 1 to 76 contained in each transmission frame of the digital I and Q signals DI and DQ.

As the result of the detection of frequency offset of the intermediate frequency digital audio signal SIF carried out on the strength of the digital I and Q signals DI and DQ, frequency offset detection output data DFOS are obtained from the frequency offset detector 20 at every one of the Symbols 1 to 76 contained in each transmission frame of the digital I and Q signals DI and DQ and supplied to a control data generator 30.

In the control data generator 30, control data DCL are produced based on both of the frequency offset detection output data DFOR and the frequency offset detection output data DFOS obtained separately from the frequency offset detector 20. The control data DCL thus obtained from the control data generator 30 are subjected to a digital to analog conversion processing to produce a control signal SCL at a D/A convertor 31 and the control signal SCL is supplied to the local oscillator 14.

In the local oscillator 14, the frequency of the local oscillation signal OSL is controlled to vary in response to the control signal SCL from the D/A convertor 31, that is, in response to each of the frequency offset detection output data DFOR and the frequency offset detection output data DFOS obtained separately from the frequency offset detector 20. As a result of this, the intermediate frequency digital audio signal SIF obtained from the frequency convertor 13 as the received digital audio broadcasting signal is caused to be reduced in frequency offset. This means that the frequency offset of the intermediate frequency digital audio signal SIF obtained from the frequency convertor 13 as the received digital audio broadcasting signal is reduced in response to each of the frequency offset detection output data DFOR and the frequency offset detection output data DFOS obtained as the result of the detection of frequency offset of the intermediate frequency digital audio signal SIF carried out in the frequency offset detector 20.

As described above, a frequency synchronizing control to the intermediate frequency digital audio signal SIF is carried out in response to the result of the detection of frequency offset of the intermediate frequency digital audio signal SIF carried out in the frequency offset detector 20, so as to reduce the frequency offset of the intermediate frequency digital audio signal SIF obtained from the frequency convertor 13 as the received digital audio broadcasting signal, in a portion including the frequency convertor 13, the local oscillator 14, the control data generator 30 and the D/A convertor 31. Therefore, a frequency synchronizing controller which is operative to cause the intermediate frequency digital audio signal SIF obtained from the frequency convertor 13 as the received digital audio broadcasting signal to have reduced frequency offset in response to each of the frequency offset detection output data DFOR and the frequency offset detection output data DFOS obtained from the frequency offset detector 20, is constituted by the portion including the frequency convertor 13, the local oscillator 14, the control data generator 30 and the D/A convertor 31.

Further, the frequency convertor 13 constitutes, together with the receiving antenna and the radio frequency amplifier 12, a signal receiving portion for receiving the digital audio broadcasting signal SRF to obtain the intermediate frequency digital audio signal SIF as the received digital audio broadcasting signal.

In the frequency synchronizing control to the intermediate frequency digital audio signal SIF carried out as described above, since the control is performed in response to both of the frequency offset detection output data DFOR and the frequency offset detection output data DFOS obtained from the frequency offset detector 20, the intermediate frequency digital audio signal SIF can be rapidly put into a frequency synchronizing condition and the intermediate frequency digital audio signal SIF put in the frequency synchronizing condition can be prevented from being easily influenced adversely by undesirable variations in the digital audio broadcasting signal SRF resulting from fading thereon or the like.

Further, since the frequency synchronizing controller comprises the frequency convertor 13 provided in the signal receiving portion for causing the digital audio broadcasting signal SRF received by the signal receiving portion to be subjected to frequency conversion, the frequency synchronizing control for reducing the frequency offset of the intermediate frequency digital audio signal SIF can be surely carried out with a relatively simple circuit structure.

What is claimed is:

1. An apparatus for receiving digital information signals comprising:

a signal receiving portion for receiving a digital information signal and for transmitting digital data composed of a series of transmission frames each divided into a plurality of Symbols and including a reference Symbol used for synchronization to obtain a received digital information signal;

a reference Symbol data extracting portion for extracting data transmitted through the reference Symbol for each of the transmission frames of digital data obtained from the received digital information signal;

a frequency offset detecting portion for producing a first frequency detection output regarding the received digital information signal based on the data transmitted through the reference Symbol for each of the transmission frames and for producing a second frequency offset detection output regarding the received digital information signal based on specific data included in data transmitted in each of the plurality of Symbols; and a frequency synchronizing control portion for reducing a frequency offset of the received digital information signal in response to the first and second frequency offset detection outputs produced by said frequency offset detecting portion, wherein said frequency offset detecting portion checks a correlation between the specific data included in the data transmitted in each of the plurality of Symbols and the specific data included in data transmitted through one of the Symbols delayed by a predetermined time for obtaining a correlation value and for calculating a frequency offset based on a phase of a peak position of an integrated correlation value obtained by performing an integration on the correlation value during a period corresponding to the specific data used for producing the second frequency offset detection output.

2. An apparatus for receiving digital information signals comprising:

a signal receiving portion for receiving a digital information signal and for transmitting digital data composed of a series of transmission frames each divided into a plurality of Symbols and including a reference Symbol used for synchronization to obtain a received digital information signal;

a reference Symbol data extracting portion for extracting data transmitted through the reference Symbol for each of the transmission frames of digital data obtained from the received digital information signal;

a frequency offset detecting portion for producing a first frequency detection output regarding the received digital information signal based on the data transmitted through the reference Symbol for each of the transmission frames and for producing a second frequency offset detection output regarding the received digital information signal based on specific data included in data transmitted in each of the plurality of Symbols; and a frequency synchronizing control portion for reducing a frequency offset of the received digital information signal in response to the first and second frequency offset detection outputs produced by said frequency offset detecting portion, wherein said frequency offset detecting portion performs a frequency analysis of the data transmitted through the reference Symbol and calculates a frequency offset based on a result of the frequency analysis for obtaining the first frequency offset detection output, and wherein said frequency offset detecting portion checks a correlation between the specific data included in the data transmitted in each of the plurality of Symbols and the specific data included in data transmitted through one of the Symbols delayed by a predetermined time for obtaining a correlation value and for calculating a frequency offset based on a phase of a peak position of an integrated correlation value obtained by performing an integration on the correlation value during a period corresponding to the specific data used for producing the second frequency offset detection output.

* * * * *